(No Model.)
H. M. SKINNER.
ROLLING COLTER.
No. 288,672. Patented Nov. 20, 1883.
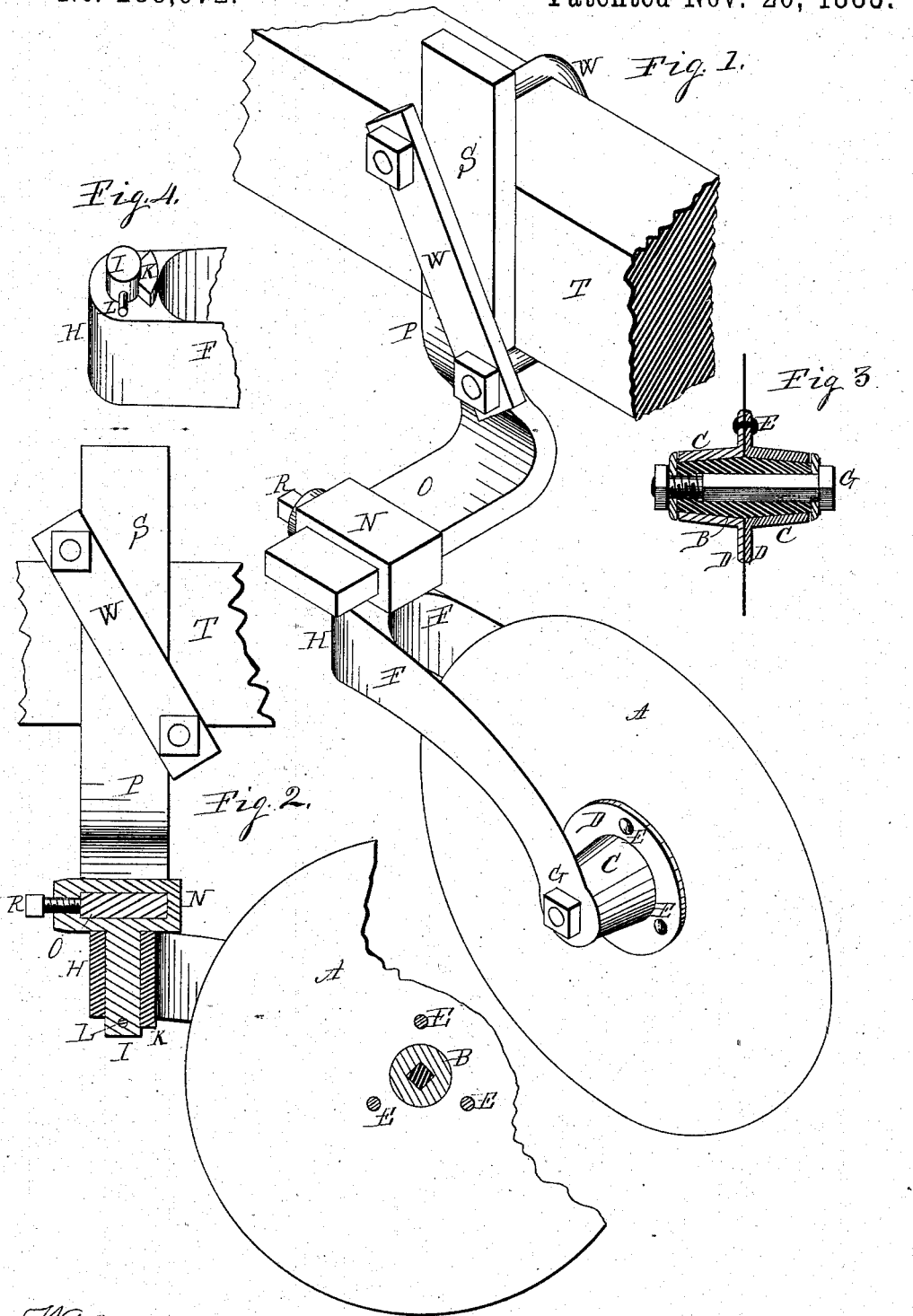

UNITED STATES PATENT OFFICE.

HENRY M. SKINNER, OF ROCKFORD, ILLINOIS, ASSIGNOR OF ONE-HALF TO ROCKWOOD SAGER, OF SAME PLACE.

ROLLING COLTER.

SPECIFICATION forming part of Letters Patent No. 288,672, dated November 20, 1883.

Application filed June 4, 1883. (No model.)

To all whom it may concern:

Be it known that I, HENRY M. SKINNER, a citizen of the United States, residing in the city of Rockford, in the county of Winnebago and State of Illinois, have invented new and useful Improvements in Rolling Colters, of which the following is a specification.

This invention relates to that class of colters known in the trade as the "caster-colter," and the object of this invention is to improve this class of colter, to render it more efficient and a more durable implement at a reduced cost; and it consists in a connection of the caster-yoke with a bracket-support to admit of lateral adjustment of the collar relatively with the plow-beam.

In the accompanying drawings, Figure 1 is an isometrical representation of a colter embodying my invention. Fig. 2 is a central section in the plane of the colter-blade. Fig. 3 is a section on the axial center of the colter-hub and bearing, and Fig. 4 is an isometrical under face view of the yoke-connection with the socket-journal.

In the figures, A represents a rolling colter-blade, of the usual disk form, produced from plate-steel, and its periphery is reduced to a cutting-edge, and its center is perforated to receive a journal-bearing.

At B is represented a double conic-formed bearing, having a rectangular axial opening of proper dimensions to receive a rectangular axial bolt. This journal is produced from cast-iron, having its conic bearing-surfaces chilled in the usual manner.

At C are represented tubular bearings, consisting of like parts produced from cast-iron in conic tubular form, having chilled internal surfaces of a conformation and dimensions to properly receive the conic-formed journal-bearing B, in a manner to revolve freely thereon. These, like tubular bearings C, are each provided on their inner enlarged end with a disk-flange, D, designed to engage the colter-blade, one on each side. In fitting up the colter the double conic bearing is placed in the eye or center opening of the blade, and one of the tubular flanged bearings are placed on each side of the colter-blade on the double conic journal-bearing, and are fixed in position thereon by means of rivets E, passed through the parts and securely riveted. By this double conical construction of the journal-bearing and of the conical form of the tubular bearings to receive the conical journal-bearings I am enabled to produce them in cast-iron, having chilled bearing-surfaces to engage each other in a proper manner without fitting, by which I produce a more durable article at a small cost.

At F is represented a bifurcated caster-yoke, having the ends of its arm perforated to receive an axial bolt, G, which is passed through the arms and axial center of the double conic bearing, and by means of the screw-nut firmly fix the parts in such a manner as to permit the colter to revolve within the yoke on its chilled bearings. The forward end of the bifurcated caster-yoke, at the junction of its arms, is fitted with a tubular bearing-socket, H, to receive a stud journal-bearing, I, and its lower end, at K, is produced in clutch form, which, in connection with the holding-pin L, passed through the depending end of the stud-journal, serves to limit the oscillatory movement of the yoke on its journal-support. The upper end of the stud journal-bearing I is produced in socket form, as at N, having its axis crossing the axis of the stud-journal at a right angle. This socket N is rectangular in section and of a proper size to receive the horizontal arm O of the bracket-support P in such a manner as to be capable of adjustment thereon in the direction of its length. This socket N is fitted with a set-screw, R, by means of which the socket, when adjusted, can be fixed in position on the bracket-arm. The bracket-support P is produced from a metallic bar, bent in the form represented, consisting of the horizontal arm O and a vertical arm, S, to rest against the vertical side of the plow-beam T, to which it is adjustably fixed, in the usual manner, by means of the usual screw-bolt clamping-staple, W, which embraces the parts.

From the foregoing it will be seen that by means of the screw-bolt staple-clamping connection of the vertical arm of the supporting-bracket with the plow-beam the colter is made vertically and lengthwise adjustable on the beam, to give it position thereon and to regulate its running depth, and by means of the socket-connection of the colter with the horizontal arm of the supporting-bracket it is made laterally adjustable to place it in line with the plow.

I claim as my invention—

The combination of the caster-yoke having vertical socket H, provided with clutch K, the bracket-support having horizontal arm O, and the intermediate rectangular socket, N, provided with set-screw R, and stud-bearing I, having securing-pin L, substantially as and for the purpose herein shown and described.

HENRY M. SKINNER.

Witnesses:
A. O. BEHEL,
JACOB BEHEL.